United States Patent [19]

Lyon

[11] Patent Number: 4,740,894
[45] Date of Patent: Apr. 26, 1988

[54] COMPUTING PROCESSOR WITH MEMORYLESS FUNCTION UNITS EACH CONNECTED TO DIFFERENT PART OF A MULTIPORTED MEMORY

[75] Inventor: Richard F. Lyon, Los Altos Hills, Calif.

[73] Assignee: Schlumberger Systems and Services, Inc., Palo Alto, Calif.

[21] Appl. No.: 844,468

[22] Filed: Mar. 26, 1986

Related U.S. Application Data

[63] Continuation-in-part of Ser. No. 781,231, Sep. 27, 1985, abandoned, which is a continuation of Ser. No. 927,147, Aug. 18, 1983, abandoned.

[51] Int. Cl.⁴ .................... G06F 15/00; G06F 15/31; G06F 12/00
[52] U.S. Cl. .................................. 364/200; 364/736; 364/724
[58] Field of Search ........ 364/724, 736, 200 MS File, 364/900 MS File

[56] References Cited

U.S. PATENT DOCUMENTS

| | | | |
|---|---|---|---|
| 3,970,993 | 7/1976 | Finnila | 364/200 |
| 3,979,728 | 9/1976 | Reddaway | 364/200 |
| 3,993,890 | 11/1976 | Peled et al. | 235/152 |
| 4,128,880 | 12/1978 | Cray, Jr. | 364/200 |
| 4,149,242 | 10/1979 | Pirz | 364/200 |
| 4,164,787 | 8/1979 | Aranguren | 364/200 |
| 4,181,956 | 1/1980 | Schwab et al. | 364/521 |
| 4,215,401 | 7/1980 | Holsztynski et al. | 364/200 |
| 4,302,818 | 11/1981 | Niemann | 364/736 |
| 4,302,819 | 11/1981 | Ware | 364/737 |
| 4,304,002 | 12/1981 | Hunt | 371/48 |
| 4,380,046 | 4/1983 | Frosch | 364/200 |
| 4,435,765 | 3/1984 | Uchida et al. | 364/200 |
| 4,450,533 | 3/1984 | Petit | 364/724 |
| 4,466,125 | 8/1984 | Kanayama | 455/56 |
| 4,470,109 | 9/1984 | McNally | 364/200 |
| 4,484,349 | 11/1984 | McCubbrey | 382/48 |
| 4,550,437 | 10/1985 | Kobayashi et al. | 364/200 |
| 4,553,203 | 11/1985 | Ran et al. | 364/200 |
| 4,580,215 | 4/1986 | Morton | 364/200 |
| 4,636,942 | 1/1987 | Chen et al. | 364/200 |

FOREIGN PATENT DOCUMENTS

| | | |
|---|---|---|
| 1445714 | 8/1976 | United Kingdom . |
| 1536933 | 12/1978 | United Kingdom . |
| 2020458 | 11/1979 | United Kingdom . |
| 2037042 | 7/1980 | United Kingdom . |

OTHER PUBLICATIONS

Richard F. Lyon, "MSSP: A Bit-Serial Multiprocessor for Signal Processing", VLSI Signal Processing, 11/1984, pp. 64-75.

Primary Examiner—Raulfe B. Zache
Assistant Examiner—Thomas C. Lee
Attorney, Agent, or Firm—Fitch, Even, Tabin & Flannery

[57] ABSTRACT

A processing element may be used either separately or in an array of similar processing elements for performing concurrent data processing calculations. The processing element includes a multiported memory unit for storing data to be processed by any of a plurality of function units which are connected to the multiported memory unit. The multiported memory unit includes a number of data storage slots for storing data words to be processed and the results of said processing. Each function unit performs a calculation having as its inputs one or or more data words from the multiported memory unit. The result of this calculation is stored back in the multiported memory unit. The transfer of data to and from the function units is accomplished by use of the ports on said multiported memory unit. The data manipulated by the processing element is controlled by specifying a correspondence between data storage slots, memory input ports and memory output ports.

11 Claims, 4 Drawing Sheets

COMPUTING PROCESSOR WITH MEMORYLESS FUNCTION UNITS EACH CONNECTED TO DIFFERENT PART OF A MULTIPORTED MEMORY

This application is a continuation-in-part of applicant's copending application, Ser. No. 781,231 filed Sept. 27, 1985, now abandoned, which was a continuation of applicant's prior application, Ser. No. 527,147 now abandoned.

BACKGROUND OF THE INVENTION

The present invention relates generally to the field of computer systems and more particularly to computer processing elements for use in concurrent computing systems.

Although general purpose computing systems of the Von Neumann type have made great advances in both computing speed and cost per computation through improvements in VLSI circuit design and fabrication, these systems are still too slow to perform many real time computational problems. Computer applications in the signal processing area often require more than a billion calculations per second. This is far above the through-put of currently available Von Neumann computers.

The classical Von Neumann computer consists of a memory connected to a central processing unit. Instructions and data are fetched from the memory by the central processing unit which is responsible for essentially all of the computational tasks. The typical central processing unit is capable of executing hundreds of different instructions. However, it can not execute these simultaneously. Hence, at any given time, most of the circuitry in the central processing unit is idle, since the central processing unit typically executes only one instruction at a time. In addition to reducing the cost effectiveness of the central processing unit, this idle circuitry reduces the speed at which the central processing unit can operate. The need to include this circuitry on the computer chip results in a larger chip with longer connecting paths between the various processing elements. These longer signal paths have significant parasitic capacitances which limit the speed at which they can be driven. Hence, as the size of the central processing unit is increased, the maximum clock rate at which it can run is decreased. This further reduces the cost effectiveness of the central processing unit.

In addition, the memory from which the central processing unit fetches instructions and data is typically located on a separate chip and hence is also limited in speed by the capacitances of the signal paths. This limitation can be reduced somewhat by including a small fast cache memory on the central processing unit chip for holding instructions and/or data which would otherwise be repeatedly transferred between the central processing unit and the large system memory. However, the size of the cache memory needed to relieve the problems introduced by the off chip system memory may be too large to be included on the central processing unit chip.

These limitations of the classical Von Neumann computer design have been overcome to some degree in the prior art by designing special purpose computing hardware which is optimized for a particular computational task. For example, a common problem in signal processing involves the construction of a digital filter which functions in an analogous manner to an analog band pass filter. The computations involve forming a sum of the products of the digital signal multiplied by weighting factors depending on the time at which each digital signal value was measured. This may be accomplished by constructing a linear array of N processors. At any given time, the Kth processor in the linear array contains the value of the digital signal as it existed K clock periods earlier. During each clock period, each processor computes one term in the sum, i.e., the product of the digital signal value it currently is storing and a constant inputted to it on a separate signal line and stored with the processing element. The result of this computation in the Kth processor is then added to result from the (K−1)th processor and passed on the (K+1)st processor together with the digital signal value that was stored in the Kth processor. A new digital signal value is inputted to the first processor after start of each clock period. The value of the sum outputted from the Nth processor is used to calculate the filtered signal value corresponding to the digital signal value.

The problem with this type of special purpose hardware is its lack of versatility. For example, the array of processors described above cannot be easily reconfigured to perform a calculation requiring two multiplies and an addition in each processor. Similarly, if the particular problem does not require all N stages, the unused stages cannot be used to perform other multiplication and addition steps. As a result, these special purpose processors only have a high efficiency as measured by computations per second per square micron of integrated circuit area for a small class of problems.

There have been a number of attempts to construct more general purpose processors which avoid the limitations of the classical Von Neumann computer. The vector processing computer described by Cray (U.S. Pat. No. 4,128,880) is typical of such a computer. This computer is optimized for repetitive calculations involving a small number of operations which are to be performed successively on each element of one or more vectors. For example, the process may involve adding corresponding elements of two vectors and then storing the result in the corresponding element of a third "result" vector. The data making up the vectors is transferred to a set of vector registers in this special purpose computer from a main memory which is usually part of a large computing system in which this special purpose system is incorporated. This architecture provides a substantial improvement over the classical Von Neumann architecture for a number of reasons. First, the vector registers provide a high speed memory system optimized for transferring successive elements of one or more vectors to one of a plurality of function units which performs the desired calculation and then transferring the results back to one of the vector registers. This reduces the time needed to transfer data back and forth between the slower system memory, since data that is repeatedly used is held in the vector registers until it is no longer needed. Hence, the need to transfer the same data back and forth between the slower system memory and the central processing unit is significantly reduced. Second, the instructions needed to carry out the operations on the vectors need not be repeatedly transferred between the system memory and the vector processor. Third, the function units may be optimized for the specific calculation. This allows smaller chip areas to be used and hence higher clock rates.

This type of vector processor may be reconfigured to a limited degree which makes it applicable to a broader class of problems than the signal processing computer described above. In the "chaining mode" described by Cray, the results from one vector operation which are stored in a result vector register are immediately available as operands to a second function unit which may perform computations concurrently with other function units.

This type of vector processor, however, suffers from three significant problems. First, it is a special purpose system which is only optimized for a specific limited class of computational problems, i.e., those involving applying a small computational program successively to each element in one or more vectors. It is inefficient at carrying out computations not in this class, and there is no way to reconfigure it when a problem for which it is not optimized is encountered. For example, if the vectors in question are too long to fit into the vector registers, there is no simple way of combining two registers to form one long register. Similarly, if the code needed to carry out the computations does not fit in the internal memory allocated for code storage, there is no way to utilize free memory in the vector register area to provide additional code storage space. In these cases, the calculation must be broken into sub-calculations which are run in tandem on the processor.

Second, it is difficult to configure such a system such that all the various function units operate concurrently. If the particular computational program does not utilize all of the function units present in the processor, there is no practical method for applying the idle computational power to another part of the overall program running on the main computer system to which the vector processor has been connected.

Finally, this type of vector processor may not be efficiently combined with other such processors to form a processing array similar to that described above with regard to digital filtering. There are numerous situations in which the optimum processor configuration consists of an array of processors in which each processor performs the same computation, but on different data. The digital filtering example is such a case. Because of the high costs inherent in designing and testing a new VLSI circuit, considerable economies of scale can be realized if an array of processors is used rather than constructing one large special purpose processor having the equivalent number of function units. This is particularly true when the individual processors are of a sufficiently general nature that they may be applied to a wide variety of problems. In such a case the design and initial fabrication costs can be spread over a large number of parts thus allowing significant economies of scale to be obtained. To obtain the maximum economies of scale in this case, the replicated processor unit should contain as little control circuitry as possible, since this control function can be applied at the array level by a single control processor which services all processors in the array, thus eliminating the need to replicate this control hardware in each processor.

The vector processor design described above contains considerable control circuitry which is designed to allow it to run independently of system control for significant periods of time. This includes memory for storing the code of the program to be executed and instruction decoding circuitry which is different for different instructions. At most, an array of such vector processors requires one copy of this circuitry. The unnecessary replication of this circuitry requires larger computer chips which in turn leads to slower clock rates as well as higher design and construction costs. Furthermore, arrays of processors of this type would suffer from input/output bottlenecks, since one bus is used for transferring data and instructions to and from each processor.

Broadly, it is an object of the present invention to provide a reconfigurable computer processor.

It is a further object of the present invention to provide a reconfigurable computer processor which contains a minimum amount of control circuitry.

It is a still further object of the present invention to provide a computer processor that may be efficiently combined with other such processors to form a processing array which may be controlled by a single controller.

These and other objects of the present invention will become apparent from the following detailed description of the present invention and the accompanying drawings.

SUMMARY OF THE INVENTION

The present invention consists of a processing element which may be used either separately or in an array of similar processing elements for performing concurrent data processing calculations. The processing element includes a multiported memory unit for storing data to be processed by any of a plurality of function units which are connected to the multiported memory unit. The multiported memory unit includes a number of data storage slots for storing data words to be processed and the results of said processing. Each function unit performs a calculation having as its inputs one or more data words from the multiported memory unit. The result of this calculation is stored back in the multiported memory unit. The transfer of data to and from the function units is accomplished by use of the ports on said multiported memory unit. The multiported memory unit has a plurality of memory input ports used for receiving data to be stored therein and a plurality of memory output ports used for transmitting data which is stored in said multiported memory unit. Each function unit has one or more function unit input ports and one or more function unit output ports. Each function unit receives its inputs over its function unit input ports and transmits its results over its function unit output ports. Each function unit output port is connected to one memory input port and each function unit input port is connected to one memory output port. The total number of memory input ports is greater than or equal to the total number of function unit output ports. The excess memory input ports, if any, which are not connected to a function unit may be used for inputting data to be stored in the multiported memory unit from adjacent processing elements or from a host computer system in which the processing element is integrated. Similarly, the number of memory output ports is greater than or equal to the total number of function unit input ports. The excess memory output ports, if any, which are not connected to a function unit may be used for outputting data from the multiported memory unit to adjacent processing elements or a host computer. The data word stored in any data storage slot may be transmitted through any memory output port. Similarly, the data word received on any memory input port can be stored in any data storage slot in the multiported memory unit. The data manipulated by the processing element is controlled by specifying a correspondence between data storage slots, memory input ports and memory output ports. The processing element includes circuitry for receiving a list of data storage slots corresponding to each memory output port over which the data word in said data storage slot is to be sent. The processing element also includes circuitry for receiving a list of data storage slots corresponding to each memory input port from which data is to be stored in said data storage slot. The processing element also includes circuits for receiving a list of operation codes defining the functions to be carried out by each function unit.

DETAILED DESCRIPTION OF THE INVENTION

Figure 1:
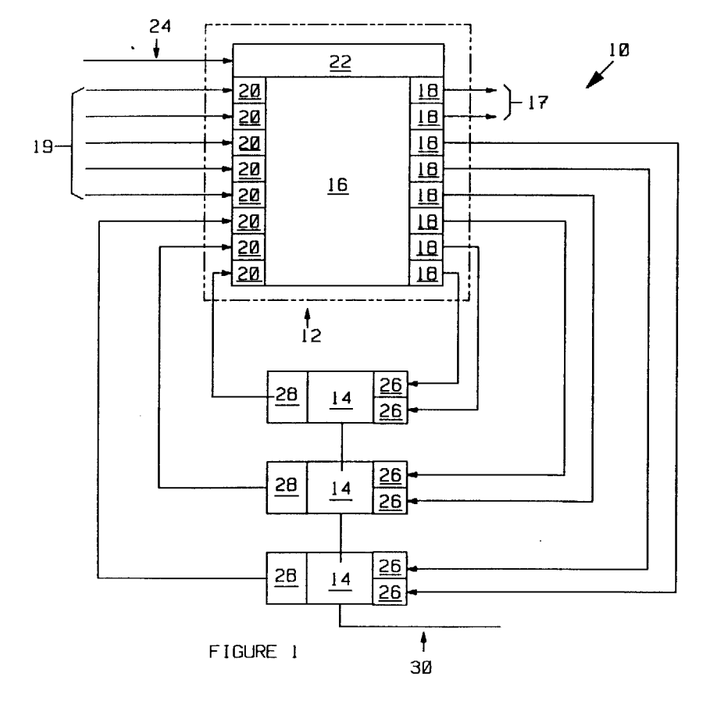
FIG. 1 is a block diagram of a processing element according to the present invention.

A block diagram of a processing element according to the present invention for use in a data processing system is shown at 10 in FIG. 1. The processing element includes a multiported memory 12 which is used to store data and control the flow of that data to and from a plurality of function units 14 which perform various operations on the data. The multiported memory 12 also provides the means for communicating data between the processing element and other similar processing elements or an external data processing system. The multiported memory 12 includes four basic elements, a random access memory 16, a plurality of memory output ports 18, a plurality of memory input ports 20, and a memory controller 22. The random access memory 16 is used to store data which is to be processed by the function units 14 or which is to be passed on to other processing elements or an external data processing system. In the preferred embodiment, the random access memory 16 is organized into a plurality of memory slots of fixed length with one such memory slot being used to store each word of data.

The memory output ports 18 are used to transmit data stored in the random access memory 16. The memory input ports 20 are used to receive data to stored in the random access memory 16. The input ports 19 and output ports 17 which are not connected to a function unit may be used to transfer data between a processing element and an adjacent processing element or host data processing system. The memory output ports 18 which are connected to function units 14 may also be used to transmit data to an adjacent processing element at the same time they are used to transmit data to the function unit if these output port lines are connected off of the chip on which the processing element of the present invention is constructed. Similarly, the memory input ports 20 which are connected to function units 14 may also be used to receive data from an adjacent processing element when said memory input ports are not actually receiving data from a function unit.

These input and output operations are carried out under the control of the memory controller 22 which is responsive to signals on a control bus 24 which define input and output lists of data words. During each major memory cycle, as defined below, one word of data is copied from the random access memory 16 to each of the memory output ports 18, and one word of data is copied back into the random access memory 16 from each of the memory input ports 20. The location in the random access memory 16 from which each said word is to be copied is specified by an ordered list of addresses sent to the memory controller 22 on the control bus 24 by the data processing system in which said processing element is integrated. The order of the addresses in this list specify the memory output port 18 which is to receive the data stored at the address in question. Similarly, the location in the random access memory 16 at which each data word currently at a memory input port 20 is to be stored is specified by an ordered list of addresses sent to the memory controller 22 on the control bus 24. The order of each address specifies the memory input port 20 whose contents are to be copied to the memory location specified by said address. A "blank" address may be used to specify that no input or output is to be performed with a given memory input or output port. These input and output lists allow the memory controller 22 to function as both an input control means for entering data into the random access memory 16 and an output controller for transmitting data from said memory.

Each of the function units 14 performs a calculation using one or more data words stored in the multiported memory 12. The function units 14 may be simple adders, more general arithmetic logical units of the type used in the central processing unit of a typical prior art computing system, or special purpose function units, e.g., a function unit for evaluating an expression such as $a*b+c$. In the preferred embodiment, the result of any function unit calculation is independent of the previous calculation carried out by the function unit in question; i.e., the function units have no memory. This simplifies the control of the system, since the controller does not have to keep track of the previous history of a particular function unit. Each function unit 14 has one or more function unit input ports 26 which are used for transferring data into the function unit 14 in question. There is one such function unit input port 26 for each data word used as an input to the function unit in question. Each function unit input port 26 is connected to a different one of the memory output ports 18. Similarly, each function unit 14 has one or more function unit output ports 28 for transmitting the results of the operation performed by said function. Each of the function unit output ports 28 is connected to a different one of the memory input ports 20.

The exemplary function units 14 shown in FIG. 1 have two function unit input ports 26 and one function unit output ports 28; however, it will be apparent to those skilled in the art that different numbers of function unit input ports 26 and function unit output ports 28 may be used on each function unit 14. For example, a function unit 14 for computing the value of the expression $a*b+c$ would have three function unit input ports 26 for receiving the values of a, b, and c. Similarly, a function unit 14 for computing a function of a complex number having a real and imaginary part would have two function unit output ports 28, one for transmitting the real part of the result to the multiported memory 12 and one for transmitting the imaginary part of the result to the multiported memory 12.

The total number of function unit input ports 26 must be less than or equal to the total number of memory output ports 18. The memory output ports 18 which are not used for transmitting data to the function units 14 are used for transmitting data to other data processing elements of the data processing system in which the processing element of the present invention is integrated. Similarly, the total number of function unit output ports 28 must be less than or equal to the total number of memory input ports 20. The memory input ports 20 which are not used for receiving data from one of the function units 14 are used for receiving data from other data processing elements of the data processing system in which the processing element of present invention is integrated. These other processing elements may be processing elements according to the present invention or data processing elements of a more traditional nature.

The operation of the processing element 10 shown in FIG. 1 may be most easily understood by considering a simple version of said processing element in which each of the function units 14 is capable of performing precisely one operation. The operation in question may be different for different function units 14. All of the function units 14 perform their respective operations at the same time. At the beginning of each major memory cycle, the list of addresses specifying the input data for each of the function units 14 is transmitted to the memory controller 22 by the host data processing system system over bus 24. The memory controller 22 causes the data stored at the first address to be outputted on the first memory output port 18, the data stored at the second address to be outputted on the second memory output port 18, and so on. At the end of these output operations, each function unit 14 will have been loaded with the correct input data for its particular operation.

A second list of addresses is then transmitted to the memory controller 22 by the host data processing system system over bus 24 which specifies the locations in the random access memory 16 at which the results of the operations specified by the first list are to be stored. After a time which is sufficient to allow the function units 14 to complete their operations has expired, the memory controller 22 causes the data present on the first memory input port 20 to be stored at the first address in this second list, the data present on the second memory input port 20 to be stored at the second such address, and so on. When this storage operation is completed, a new major memory cycle may commence.

Hence, during the major memory cycle described above, one operation is completed by each function unit 14 using data words inputted to it through the memory output ports 18 which are connected to said function unit. In addition, one output data word is transferred from the processing element 10 to an "adjacent" processing element on each of the memory output ports 18 which are not connected to a function unit input port 26, and one input data word is stored in the random access memory 16 from each memory input port 20. If the memory input port 20 in question is connected to a function unit 14, this data word will be the result of the function unit calculation. If the function unit 14 is not connected to a function unit output port 28, these input data words will have originated in one of the adjacent processing elements or in the host data processing system. It should be noted that, since there is a fixed correspondence between memory input ports, memory output ports, and function units, the input and output lists define a set of "instructions" which are carried by the processing element during major memory cycle in which said lists are received. A more detailed implementation of the present invention is described below.

In the preferred embodiment, the processing element of the present invention is fabricated on a single VLSI circuit chip. Fabrication on a single chip results in lower cost and higher speed operation than may, in general, be achieved in multi-chip systems. As pointed out above the maximum clock speed at which the processing element may be run is determined by the parasitic capacitances of the various signal paths which connect the functional elements of the processing element. Off-chip conducting paths have significantly higher parasitic capacitances and, hence, are to be avoided. The constraint of single chip fabrication places a limit on the total amount of circuitry which may be included in the processing element. The present invention requires considerably less circuitry than prior art processing elements which are capable of the same computational throughput.

One key to this reduction in circuitry is the uniform methodology used for transferring data between the random access memory 16 and the adjacent processing elements and between the random access memory 16 and the various function units 14. These data transfers are carried out by the same control circuitry in the present invention. In fact, the memory controller 22 has no way of knowing whether the data it is transferring to and from the random access memory 16 is being communicated between the random access memory 16 and its function units or between the random access memory 16 and processing elements which are external to the processing element containing said memory controller 22. The prior art systems use circuitry to transfer data between local memories and function units which is different from the circuitry used to move data between the host data processing system and the local memories. This additional circuitry reduces the on-chip space available for other circuitry such as function units.

In addition, the processing element of the present invention supports multiple data paths into and out of the processing element. This allows more data to be transferred between the processing element and the data processing system which is supplying the data to be processed. This is particularly important in processing elements having multiple function units, since such systems can often produce results in less time than it takes to transfer the results and obtain new input data. Such prior art systems often must wait for the relevant data to be transferred over a single bus which has a bandwidth which is significantly less than the bandwidth of the combined function units. The multiple data paths of the present invention together with the overlapping of input/output operations and data processing results in a substantial reduction in the on-chip memory needed to guarantee that all of the function units will operate at their optimum throughput.

The higher complexity input/output designs of the prior art systems significantly reduce the throughput of such systems. For example, consider the vector processing system taught by Cray in the above cited U.S. patent. It too includes a local memory which is used to deliver data words to function units and to store the results from these function units. In fact, it contains several such memories which are used to store data words of different types. These memories are loaded over a single bus from a large system memory which is part of the data processing system in which it is integrated. The data transfer operations used to load and unload the local memories are carried out by circuits which are separate from those used to transfer the data in question to and from the various function units which process the data. This added complexity requires additional circuitry. In addition, this design does not lend itself to multiple data paths between the host data processing system and the relevant memories. This can result in input/output bottlenecks which reduce the throughput of the system.

Furthermore, this vector processing system requires still other circuitry for transferring data between its various local memories. In the Cray system, data of different types is stored in different local memories and processed by different function units. The system is intended for processing both vectors and scalars. A "vector" is an ordered array of scalar elements. Each element of the vector is processed sequentially in the same manner as the other elements in the vector. For example, a vector operation might consist of sequentially adding corresponding elements in two vectors and storing the results in a third vector. This apparatus provides increased speed in such sequential processing because it only needs to transfer the instructions for the processing to the local memory once, even though these instructions are repeated once per vector element. This alleviates the input/output bottleneck at the main memory which would result from the repetitive transfer of these instructions over the single data bus provided for connecting this processor to its host data processing system. The present invention provides a separate data path, i.e., bus 24, for transferring these instructions; hence, no bottleneck results.

If one wished to perform a scalar operation with one or more elements stored in the vector storage area, these elements would need to be transferred to the scalar memory and operated on by the scalar function units. For example, to add the first element of a vector to the third element of the same vector and store the result in the fourth element of the vector in question, the first and third elements of the vector would first have to be transferred to the memory used for storing scalars. These elements would then be added using the function units which operate on scalars, with the result being stored at a location in the scalar memory. This result would then have to be transferred back to the vector memory.

The processing element of the present invention treats all types of data the same. The function units which process data words which are elements of a vector are used to process scalars. In fact, the present invention does not distinguish between data types. A "vector" operation is defined by transferring the addresses of various elements to the processing element of the present invention in the order in which they are to be processed. This simplifies the programming of the present invention and eliminates the need to transfer data to different locations in the local memory prior to processing that data which in turn reduces the computational "overhead" and improves the processing throughput. By providing a separate data bus for "instruction" delivery, the processing element of the present invention avoids the input/output bottlenecks described above. As will be discussed in more detail below, the present invention may further reduce the overhead on the data processing system in which it is integrated by using a dedicated controller to repeat instruction sequences. Alternatively, a vector operation may be performed on an array of processing elements according to the present invention. In this case, the vector elements are partitioned between the processing elements. Each processing element executes the same "instructions" but on different vector elements. In this way, the entire vector operation may be carried out in one major memory cycle.

In addition to reducing the circuit complexity and hence the amount of area on the chip needed to construct the processing element, this uniform mode of data treatment allows the present invention to keep a higher fraction of its function units busy than prior art designs which use different hardware for scalar and vector operations. When different hardware is employed, both sets of hardware may only be fully utilized in applications in which the ratio of vector processing to scalar processing matches the ratio of the computing power of the scalar and vector hardware components. This condition will only be met in a small fraction of the applications to which such systems are to be applied. Hence, a portion of the hardware will be idle, since such systems can not conveniently use the vector processing hardware to supplement the scalar hardware when the scalar hardware is overloaded and vice versa. In contrast, the present invention may use any adder to add two numbers whether those numbers are elements of a vector or are two scalars. Hence in an embodiment of the present invention having a plurality of function units of one particular type, all of these function units can be kept simultaneously busy, provided the relevant data words are available in the random access memory 16.

As mentioned above, the preferred embodiment of the processing element of the present invention is somewhat more complex than the simple embodiment described with reference to FIG. 1 above. The additional features present in the preferred embodiment provide more efficient use of the surface area of the chip and hence allow more computing power to be generated in a given chip area. To fully appreciate these differences, three additional features will now be described.

First, the simple embodiment described above used function units which carried out precisely one data processing operation per function unit. For example, an adder function unit was not capable of performing a subtraction; hence both adder and subtracter function units would be necessary. Function units which are capable of carrying out several different data processing functions are well known to the prior art. The amount of circuitry needed to implement a function unit which does both addition and subtraction is considerably less than the amount of circuitry needed to implement these two functions as separate function units. Hence, in the preferred embodiment, any of the function units 14 may carry out a plurality of data processing operations. Referring to FIG. 1, the precise operation to be carried out by any particular function unit 14 is communicated to that function unit on a bus 30, which is connected to the controller which delivers the addresses to the memory controller 22 over bus 24. This information is communicated to the function units 14 by sending a list of control codes to the function units prior to said function units commencing processing. This provides a particularly simple means of providing an operation control means.

Hence, the preferred embodiment of the processing element of the present invention receives three ordered lists during each major memory cycle. The first list is an output list which specifies the addresses of data words in the random access memory 16 which are to be copied to each of the memory output ports 18. The order of an address in this list determines the memory output port 18 from which the data word is to be transmitted. The second list is an operation code list which specifies the specific operation to be carried out by each function unit 14. The order of the operation code in this list specifies which function unit 14 is to carry out the operation specified by said code. The third list is an input list which specifies the addresses in the random access memory 16 at which the data words present on memory input ports 20 are to stored. The order of an address in this list determines which memory input port 20 will be the source of the data word to be transferred to said address in the random access memory 16.

In a second additional feature of the present invention, the processing element of the present invention supports function units 14 which require different processing times to complete the operations on the data inputted to them. No additional hardware is needed for this modification. The controller which supplies the addresses to the memory controller 22 is responsible for assuring that an address for the storage of a result in the random access memory 16 is not placed in the appropriate input list until the result in question is ready. The micro-code assembler which prepares the lists of addresses in question has the necessary information to determine the timing of an input instruction relative to the output of the data words to the relevant function units. The details of such a controller according to the present invention will be described in more detail below.

A third additional feature of the present invention is that the function units 14 are bit-serial in nature. The memory output ports 18 and memory input ports 20 transmit and receive data in a bit-serial format. A block diagram of the preferred embodiment of the multiported memory is shown at 40 in FIG. 2. It consists of a memory controller 42, a random access memory 44, a multiplexer 46, memory output ports 48 and memory input ports 49. Each memory output port 48 consists of a latch 50 and shift register 52. The latches 50 are loaded from the random access memory 44 under the control of the memory controller 42. When the memory controller 42 receives an instruction to write a data word located at a specified address to a specific memory output port 48, it connects the random access memory 44 to said memory output port 48 through the multiplexer 46 and causes the contents of the random access memory memory cell at that address to be written into the latch 50. At the start of each major memory cycle, the data stored in each latch 50 is transferred to the shift register 52 connected to said latch. The shift register 52 then shifts the data onto an output line 53 which is connected to the function unit input port assigned to said memory output port 48 or to an external data line.

Figure 2:
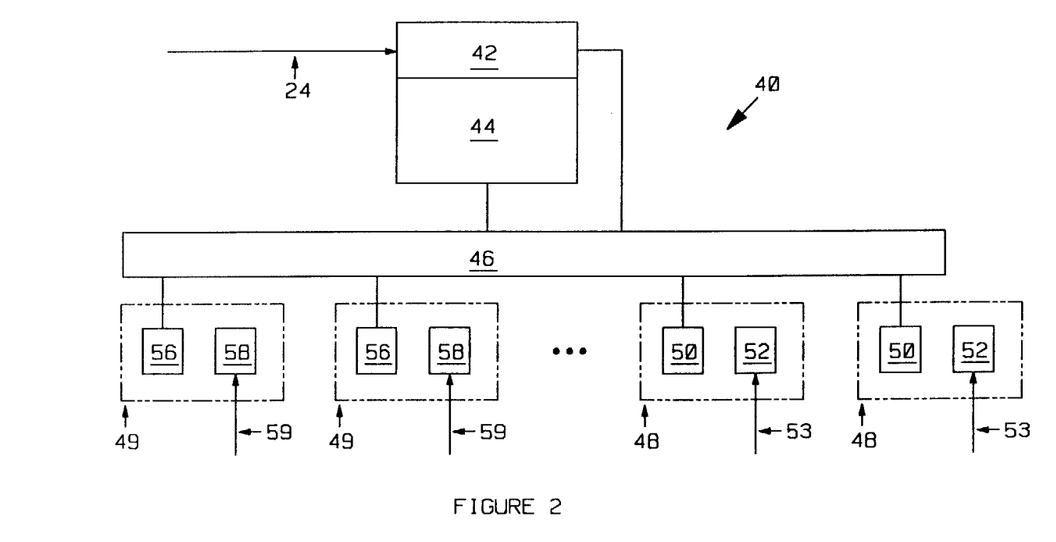
FIG. 2 is a block diagram of the preferred embodiment of multiported memory unit shown in FIG. 1.

Similarly, each memory input port 49 consists of a latch 56 connected to a shift register 58. Each shift register 58 is connected to the function unit output port of a function unit or to an external data line. As data is sent one bit at a time from said function unit, it is shifted into the shift register 58 in question. The contents of the shift register are transferred to the latch 56 connected to it during the read portion of the major memory cycle. When the memory controller 42 receives an instruction to read data from a memory input port 49 into a specified address in the random access memory 46, it connects latch 56 in the memory input port 49 in question to the random access memory 44 through the multiplexer 46 and causes the contents of said latch to be read into the random access memory 44 at the specified address.

Data transfers between the random access memory 44 and the latches 56 and 50 take place in response to the input and output lists described above. Each entry in an input list specifies an address in the random access memory 44 at which the contents of a specified memory input port 49 is to be stored. The order of the entry in the input list specifies the memory input port in question. As each such entry is received, the contents of the latch 56 associated with the memory input port 49 specified by said entry are stored in the random access memory 44 and the contents of the shift register 58 associated with said memory input port 49 are transferred to the latch 56 connected to said shift register.

Similarly, each entry in an output list specifies an address in the random access memory 44 whose contents are to be transferred to a specified memory output port 48. The order of the entry in the output list specifies the memory output port in question. As each such entry is received, the contents of the specified random access memory address are copied to the latch 50 associated with the specified memory output port 48. The previous contents of said latch 50 will have been copied into the shift register 52 connected to said latch.

These input and output lists are sent in a bit-serial format to the memory controller 42 by the data processing system in which the processing element of the present invention is integrated. The memory controller 42 does not contain any local memory for storing the input and output lists. As each entry is received, the appropriate data transfers are carried out. The data processing system is responsible for assuring that the lists in question are sent with the correct timing. This control function may be performed by the host data processing system or by a separate controller operated by the host data processing system. As will be discussed in more detail below, this division of labor between the host data processing system and the processing element minimizes the amount of circuitry which must be duplicated when the processing element of the present invention is incorporated into an array of similar processors.

Because of the buffering capacity of the latches 50 and 56, the time needed to complete a major memory cycle is essentially the time needed to shift a data word out to a function unit. In the preferred embodiment, 32 bit data words are used. The time needed to shift one bit of a data word will be referred to as one clock tick. For the purposes of this discussion, this is also the time needed to transfer a data word between a latch and the random access memory. A major memory cycle commences when the contents of each output latches 50 are transferred to the shift register 52 connected to it. These transfers take place simultaneously. Prior to these transfers, the input shift registers 58 will have been emptied. This will have been accomplished by transferring the of the input latches 56 to the random access memory 44 and the previous contents of the shift registers 58 to the corresponding latches 56.

As soon as the output shift registers 52 are loaded, they begin to shift data to the function unit input ports. It will take 32 clock ticks plus the latency time of the function units to complete these data transfers and to accumulate the results in the input shift registers 58. It will be apparent to those skilled in the art, that this latency time may be effectively eliminated by using pipelined function units. Hence the memory controller 42 has 32 clock ticks in which to read the input latches 56 into the random access memory 44 and to write the output latches 50 from the random access memory 44. Therefore, if there are no more than 32 ports to be serviced, the servicing will be completed by the beginning of the next major memory cycle. That is, a major memory cycle will take no more than the time needed to shift the data out of the output latches 52. If a particular function unit has a latency time which is much longer than the others, its result is read in the next major memory cycle, i.e., that function unit requires two major memory cycles to produce a result.

Although bit-serial function units require considerably longer to carry out a calculation, a system based on bit-serial function units often will have a throughput which is comparable to that obtained with fully parallel function unit hardware. This is because the parallel hardware speed is not matched by the speed of the supporting circuitry which must provide the input and output functions for this hardware. This may be seen from the following example.

Consider a processing element according to the present invention in which all of the function units are simple adders. The time required to add two 32 bit numbers in a bit-serial adder is 33 clock ticks; i.e., the result will be available one clock tick after the last bit of each of the input data words is received. A fully parallel adder could, in principle, produce a result in one clock tick. However, one must remember that all of the adders in the system are being serviced by the same random access memory whose output and input lines are multiplexed between the various adders. Three clock ticks will be required to service each adder, two to load the addends and one to store the result. Hence, in 30 clock tick, only ten pairs of numbers may be transferred to the adders and the results stored back in the random access memory. In 33 clock ticks, only three more clock ticks than in the fully parallel case, a bit-serial embodiment of the present invention having 10 adder function units, requiring 20 memory output ports and 10 memory input ports devoted to servicing the function units could carry out these same 10 additions and still service one input and one output line for moving data between the present invention and other processing elements. Since 10 bit-serial adders require substantially less circuitry than one 32 bit parallel adder, the bit-serial approach provides essentially the same throughput at substantially less cost in terms of the silicon area needed to fabricate the chip. This results in additional silicon area being available to construct additional function units and/or memory space.

One advantage of the processing element of the present invention is the balance between the processing capability of the function units and the processing unit's input and output capability. By changing the ratio of ports to function units, one could design a processing element which is more optimally balanced than prior art designs. Furthermore, output operations to adjacent processing elements can be overlapped with output operations to function units by connecting one or more input ports of the adjacent processing element to one or more memory output ports which are also connected to function units. This allows data to be transmitted at the same time it is being processed by a function unit. In general, function units have more function unit input ports than function unit output ports. As a result, there may be too few memory output ports for communicating data to adjacent processing elements. This sharing of one or memory output ports between a function unit and an adjacent processing element provides a means of obtaining a more balanced processing element.

In order to improve the throughput of the parallel system in the above example, one would need a multiported memory which does not service the various ports sequentially through a multiplexer. In principle, such a multiported memory could be constructed using non-blocking cross bar switches of the type used in telecommunications. Such switches are used to connect a telephone subscriber to any of a plurality of trunk lines while allowing other subscriber to be connected to other trunk lines. Here one would need a switch with as many input ports as there are storage locations in the random access memory and as many output ports as there are memory input ports and memory output ports. Such a switch would require far more circuitry than the multiplexed switch described above. In fact, for any reasonable random access memory size, i.e., a random access memory of greater than 128 words, there would be insufficient space left to fabricate the rest of the processing element.

The processing element of the present invention is particularly useful as a building block in constructing a larger data processing system of the type used in real-time signal processing applications. In these applications, a series of processing elements are combined into an array to provide the computational power needed to carry out the calculations involved. Typical of such real-time signal processing problems is the problem of computing an error estimate for a signal V(t) in an adaptive filter circuit. The signal is digitized at regular intervals and the digital values are inputted to a data processing system which computes the error estimate. The error estimate at any given time, e(t), is related to the digitized signal values by the expression $$e(t) = \sum_{i=0}^{N} V(t-i)a_i, \quad (1)$$

where V(t−i) is the value of the digitized signal i time intervals before t. N and the $a_i$ are constants. One such error estimate must be calculated during each time interval. Hence if the time intervals are short or N is large, a considerable computational capability is needed.

Figure 3:
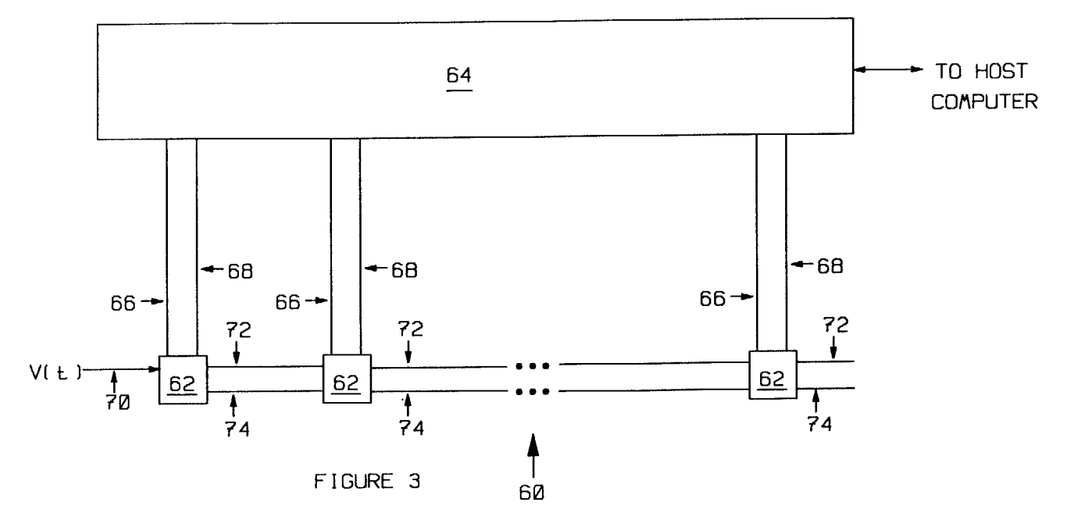
FIG. 3 is a block diagram of a processing array using processing elements according to the present invention.

A data processing array for performing this error estimate calculation is shown at 60 in FIG. 3. It is constructed from a plurality of processing elements 62 constructed according to the present invention driven by a single controller 64 which provides the same input and output lists of addresses and the same list of operation codes to each processing element over a bus 66. The output list provides a means of specifying the arguments to be used in each function unit and in each external write operation. The operation code list provides a means for controlling each of the function unit. The input list provides a means of specifying where the result of each function unit's calculations is to be stored and where data input from adjacent processors is to be stored. The controller also provides data specifying the constants $a_i$ over a signal line 68 which is connected to one memory input port in each of the processing elements 62. For simplicity of explanation, it will be assumed that each of the processing elements 62 in the array shown in FIG. 3 computes one term of the sum in equation (1), i.e., there are N such processing elements 62 in the array. It will be apparent to those skilled in the art from this simplified explanation that embodiments which require far fewer processing elements 62 may be constructed.

The processing array operates as follows. At the beginning of each time interval, a value for the signal V(t) is inputted to the first processing element 62 on a line 70 connected to one of the memory input ports in said processing element. The value of this signal at the beginning of the previous time period is simultaneously outputted on a signal path 72. Signal path 72 connects one memory output port in each processing element to a memory input port in an adjacent processing element. Similarly, each processing element in the array reads in a signal value on a specified memory input port which is connected to signal path 72 and outputs the value previously stored in it on the corresponding memory output port. Hence, when V(t) is stored in the first processing element, V(t−1) will be stored in the second processing element, V(t−2) will be stored in the third, and so on. During each time period, each processor forms the product of the value of the signal stored in it and the constant $a_i$ which is also stored in that processing element. The ith processing element has the value $a_i$ stored in it prior to the commencement of the signal processing operations. The value of the product of the constant and the signal value is added to a "sum" value inputted to each processing element on a signal path 74 which connects adjacent processing elements. This augmented sum value is then passed to the next processing element in the array at the same time the signal value is passed. The outputs of the last processing element in the array consist of the signal value as it existed N time periods earlier on signal path 72 and the value of the error estimate on signal path 74.

Since each processing element performs the same calculations, but on different data, the instructions used by each processing element are the same. That is, each processing element receives the same input and output lists of instructions. Hence the controller 64 may service an arbitrary number of processing elements. In the simplest embodiment, the controller 64 consists of a memory for storing the micro-code sequences which specify the input, output, and operation code lists. More complicated controllers which generate the micro-code for these lists from a higher language will be apparent to those skilled in the art. It should be noted that if the controller function were incorporated in each processing element, as would be the case if processing elements consisting of vector processing elements according to Cray were used, the circuitry for this control function would be duplicated unnecessarily in each processing element. Hence, by separating the control function, the present invention achieves a considerable economy of scale when used in multiprocessor arrays. In single processing element systems, the combination of the controller and the processing element is no more complex than in prior art systems.

Figure 4:
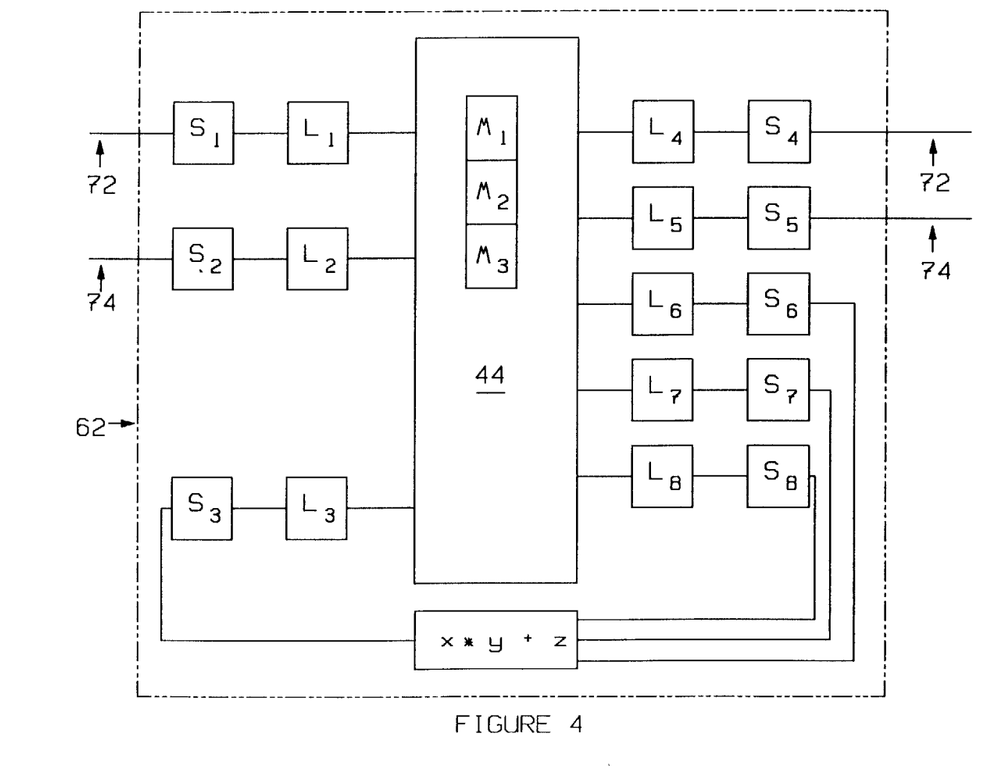
FIG. 4 is a block diagram of a portion of one of the processing elements shown in FIG. 3.

The actual process of calculating one term in the sum shown in equation (1) requires 6 major memory cycles as explained below. This process may best be understood with reference to FIG. 4. FIG. 4 is a block diagram of a portion of the ith processing element in the array. For clarity, only those memory input ports, memory output ports, and function units actually involved in the calculation are shown. The processing element uses 3 memory input ports and 5 memory output ports in the calculation. An additional memory input port which is not shown receives data from the controller 64 over a line 68. The shift register associated with the ith memory port is labeled $S_i$ in FIG. 4. Similarly, the latch associated with ith memory port is labeled $L_i$. Data is received from the "upstream" adjacent processing element through memory input ports labeled with subscripts 1 and 2. The processing element outputs data to the "downstream" adjacent processing element through memory output ports labeled labeled with subscripts 4 and 5. The term in the sum in question is calculated in a single function unit which computes the product of the two numbers on memory output ports labeled with subscripts 6 and 7 and adds this product to the number on memory output port 8. The result of this calculation is returned to the random access memory 44 through memory input port 3.

Each major memory cycle begins by reading the memory input ports. The memory output ports are then written together with the function unit operation codes. At the beginning of the first major memory cycle, the value of the signal will be in $S_1$ and the value of the sum of the terms calculated by the upstream processing elements will be in $S_2$. At the first cycle read, these values will be transferred to $L_1$ and $L_2$, respectively. Nothing is written to the memory output ports. During the read portion of the second major memory cycle, the values in $L_1$ and $L_2$ are read into two memory locations $M_1$ and $M_2$, respectively. During the write portion of the second major memory cycle, the values in $M_1$ and $M_2$ are written into $L_6$ and $L_8$, respectively. The value of the constant $a_i$ used in calculating the error estimate term is written from the location in the random access memory 44 in which it is stored to $L_7$. Nothing is done during the read portion of the third major memory cycle. During the write portion of the third major memory cycle, the values stored in latches $L_6$, $L_7$, and $L_8$ are written into shift registers $S_6$, $S_7$, and $S_8$, respectively, and are shifted out to the function unit. The result from the function unit is simultaneously shifted into $S_3$; hence, at the beginning of the fourth major memory cycle, the result will be in $S_3$. During the read portion of the fourth major memory cycle, the contents of $S_3$ are transferred to $L_3$. During the read portion of the fifth major memory cycle, the contents of $L_3$ are transferred to a memory location $M_3$ in the random access memory 44. During the write portion of major memory cycle 5, the contents of $M_1$ and $M_3$, are transferred to $L_4$ and $L_5$, respectively. Finally, during the write portion of the sixth major memory cycle, the contents of these two latches are transferred to their associated shift registers and said contents are shifted out on lines 72 and 74, respectively. At the end of the sixth write cycle, these contents will have accumulated in the memory input ports in the downstream processing element corresponding to memory input ports labeled with subscripts 1 and 2.

It will be clear to those skilled in the art that the above procedure can be pipelined to allow one processing element to process 6 terms in the series. This is because The function unit used to do the actual calculation is only used for one major memory cycle out of the six. Similarly, each of the latches and shift registers is also used only once during the six major memory cycles which make up one computational cycle. Hence one would need only to allocate additional storage space in the random access memory 44 for successive values of the signal. As each new signal value is received, the previously received data consisting of the signal values and sum terms are "pushed" ahead of it in the processing train. The data values received one cycle earlier move from the $L_1$ and $L_2$ to $M_1$ and $M_2$, respectively. The values received two cycles earlier move from $M_1$ and $M_2$ to $L_6$ and $L_8$, respectively. Those received three cycles earlier moves from $L_6$ and $L_8$ to $S_6$ and $S_8$, respectively. Those received four cycles earlier will have been processed by the function unit and and the result will now be in $S_3$. This result will be transferred to $M_3$. This processed value will be transferred back out to $L_5$ together with the original signal value received five cycles earlier which will be transferred from its storage location in the random access memory 44 to $L_4$. Finally the signal value received six cycles together with the calculated sum term corresponding to it will be transferred to $S_4$ and $S_5$, respectively. Since each signal value must be saved for retransmission six cycles later with the sum term corresponding to it, space must be allocated in the random access memory 44 for six signal values.

It will also be apparent to those skilled in the art that the processing element of the present invention may be used to construct two dimensional arrays of processing elements. For example, in a square array of processing elements, each processing element would have four "adjacent" processing elements connected to it. Each adjacent processing element would use one or more or its memory input ports and one or more of its memory output ports to provide these connections. All of the processing elements would be connected to a single controller which would supply the same instruction stream to each processing element in the array in the form of the operation code, input, and output lists described above. Such an array would be useful in image processing applications. Because of the simple input-/output structure used in the processing element of the present invention, it may easily be adapted to processing arrays of arbitrary dimension provided sufficient memory input ports and memory output ports are allocated for connecting each processing element into its adjacent processing elements in the array. Unlike prior art systems, special communication processors are not needed to interface the processing elements to each other in the present invention.

Various modifications to the present invention will become apparent to those skilled in the art from the foregoing description and accompanying drawings. Such modifications are intended to fall within the scope of the appended claims.

What is claimed is:

1. A data processing element comprising multiported memory means, function unit means, and control means;
   said multiported memory means comprising: storage means including a plurality of memory storage slots, each said memory storage slot providing storage for one data word,
   a plurality of memory output ports for transmitting data stored in said storage means, each said memory output port providing a means for outputting the data word stored in any of said memory storage slots without requiring that said data word be copied into another of said memory storage slots, and
   a plurality of memory input ports for receiving data to be stored in said storage means each said memory input port providing means for inputting a data word into any of said memory storage slots without requiring that said data word be copied into another of said memory storage slots;
   said function unit means comprising: a plurality of function units, each said function unit including means for specifying the processing operation to be carried out by said function unit, the result of said processing operation being independent of the result of any previous processing operation carried out by said function unit, each said function unit further comprising one or more function unit input ports for receiving data to be processed by said function unit from said multiported memory means and each said function unit having one or more function unit output ports for sending output data from said function unit to said multiported memory means, wherein each said function unit input port is connected to a separate one of said memory output ports and each said function unit output port is connected to a separate one of said memory input ports, no memory input port being connected to more than one function unit output port and no memory output port being connected to more than one function unit input port, the total number of said function unit input ports for all said function units being less than or equal to the total number of said memory output ports for all said function units being less than or equal to the total number of said memory input ports; and
   said control means comprising:
   output control means for receiving information specifying a memory storage slot and a memory output port and for causing the data stored in said specified memory storage slot to be transferred to said specified memory output port;
   operation control means for receiving information specifying the processing operation to be carried out by each function unit and for coupling said information to each respective said processing specifying means; and
   input control means for receiving information specifying a memory storage slot and a memory input port and for causing the data present at said memory input port to be stored in said memory storage slot.

2. The data processing element of claim 1 wherein said output control means comprises means for receiving an ordered list of addresses, each said address specifying the identity of a memory storage slot, the order of said address in said ordered list specifying a memory output port to which the data word stored in said specified memory storage slot is to be transferred, and wherein said input control means comprises means for receiving an ordered list of addresses, each said address specifying the identity of a memory storage slot, the order of said address in said ordered list specifying a memory input port from which data is to be transferred to said specified memory storage slot.

3. The data processing element of claim 1 wherein each said output port transmits data in a bit serial format and each input port receives data in a bit serial format.

4. The data processing element of claim 3 wherein each memory output port comprises:
   shift register means for transmitting a data word stored therein to the function unit input port connected to said memory output port in bit serial format; and
   latch means connected to said shift register means and said storage means for storing the next data word to be transferred to the function unit input port connected to said memory output port.

5. The data processing element of claim 3 wherein each memory input port comprises:

shift register means for receiving a data word in bit serial format from the function unit output port connected to said memory input port; and latch means connected to said shift register means and said storage means for storing the last data word received from the function unit output port connected to said memory output port.

6. A data processing system comprising:

an array of processing elements, each said processing element comprising multiported memory means, function unit means, and control means:

said multiported memory means comprising: storage means including a plurality of memory storage slots, each said memory storage slot providing storage for one data word, a plurality of of memory output ports for transmitting data stored in said storage means, each said memory output port providing a means for outputting the data word stored in any of said memory storage slots without requiring that said data word be copied into another of said memory storage slots, and a plurality of memory input ports for receiving data to be stored in said storage means, each said memory input port providing means for inputting a data word into any of said memory storage slots without requiring that said data word be copied into another of said memory storage slots, wherein at least one of said memory output ports is connected to a memory input port in an adjacent processing element in said array of processing elements and at least one of said memory input ports is connected to a memory output port in another adjacent processing element;

said function unit means comprising: a plurality of function units, each said function unit including means for specifying the processing operation to be carried out by said function unit, the result of said processing operation being independent of the result of any previous processing operation carried out by said function unit, each said function unit further comprising one or more function unit input ports for receiving data to be processed by said function unit from said multiported memory means and each said function unit having one or more function unit output ports for sending output data from said function unit to said multiported memory means, wherein each said function unit input port is connected to a separate one of said memory output ports and each said function unit output port is connected to a separate one of said memory input ports, no memory input port being connected to more than one function unit output port and no memory output port being connected to more than one function unit input port, the total number of said function unit input ports for all of said function units being less than or equal to the total number of said memory output ports and the total number of said function unit output ports for all of said function units being less than or equal to the total number of said memory input ports; and said control means comprising:

output control means for receiving information specifying a memory storage slot and a memory output port and for causing the data stored in said specified memory storage slot to be transferred to said specified memory output port;

operation control means for receiving information specifying the processing operation to be carried out by each function unit and for coupling said information to each respective said processing specifying means; and input control means for receiving information specifying a memory storage slot and a memory input port and for causing the data present at said memory input port to be stored in said memory storage slot; and controller means comprising:

means for receiving and transmitting instructions and data between said data processing system and a host data processing system;

argument specifying means for transmitting information specifying a memory storage slot and a memory output port in each said processing element, said argument specifying means being connected to the output control means of each said processing element, the same memory storage slot and memory output port being specified in each said processing element;

control code means for specifying the processing operation to be carried out in each function unit, said control code means being connected to the operation control means of each said processing element and causing corresponding function units in each processing element to perform the same processing operation;

result specifying means for transmitting information specifying a memory storage slot and a memory input port in each said processing element, said result specifying means being connected to the input control means of each said processing element, the same memory storage slot and memory input port being specified in each said processing element; and data specifying means for transmitting data to and from said controller means and at least one processing element in said array of processing elements.

7. The data processing system of claim 6 wherein said data specifying means comprises means for transmitting data from said controller means to at least one processing element in said array of processing elements and means for receiving data from at least one processing element in said array of processing elements.

8. The data processing system of claim 6 wherein each said output control means comprises means for receiving an output ordered list of addresses, each said address specifying the identity of a memory storage slot, the order of said address in said output ordered list specifying a memory output port to which the data word stored in said specified memory storage slot is to be transferred, wherein said input control means comprises means for receiving an input ordered list of addresses, each said address specifying the identity of a memory storage slots the order of a said address in said input ordered list specifying a memory input port from which data is to be transferred to said specified memory storage slot, and wherein said controller means comprises means for transmitting the same input and output ordered lists to each said processing element in said array of processing elements.

9. The data processing element of claim 6 wherein each said output port transmits data in a bit serial format and each input port receives data in a bit serial format.

10. The data processing element of claim 9 wherein each memory output port comprises:

shift register means for transmitting a data word stored therein to the function unit input port connected to said memory output port in bit serial format; and latch means connected to said shift register means and said storage means for storing the next data word to be transferred to the function unit input port connected to said memory output port.

11. The data processing element of claim 9 wherein each memory input port comprises:

shift register means for receiving a data word in bit serial format from the function unit output port connected to said memory input port; and latch means connected to said shift register means and said storage means for storing the last data word received from the function unit output port connected to said memory output port.

* * * * *

UNITED STATES PATENT AND TRADEMARK OFFICE
CERTIFICATE OF CORRECTION

PATENT NO. : 4,740,894

DATED : April 26, 1988

INVENTOR(S) : Richard F. Lyon

It is certified that error appears in the above-identified patent and that said Letters Patent is hereby corrected as shown below:

```
Column  5, line 49, after "data to" insert --be--.
Column  7, line 28, after "processing" delete "system".
Column  7, line 37, after "processing" delete "system".
Column 11, line 49, after "memory" delete "memory".
Column 12, line 56, after "the" insert --contents--.
Column 13, line 33, delete "tick" and insert therefor --ticks--.
Column 16, line 7, after "labeled" delete "labeled".
Column 16, line 58, delete "The" and insert therefor --the--.
Column 17, line 6, after "unit" delete "and".
Column 17, line 25, after "more" delete "or" and insert --of--.
Column 18, line 23, after "ports" insert --and the total number
     of said function unit output ports--.
Column 19, line 16, after "of" delete "of".
```

Signed and Sealed this

Thirty-first Day of January, 1989

*Attest:*

DONALD J. QUIGG

*Attesting Officer*  *Commissioner of Patents and Trademarks*